United States Patent [19]

Kahoe et al.

[11] 4,026,321
[45] May 31, 1977

[54] ELECTRONIC CONTROL FOR CONSTANT AND VARIABLE VOLUME CENTRAL HEATING AND AIR-CONDITIONING SYSTEMS

[75] Inventors: H. Taylor Kahoe, Mentor; George E. Coultas, Euclid; Dana W. Skipworth, Cleveland, all of Ohio

[73] Assignee: Kahoe Laboratories, Inc., Eastlake, Ohio

[22] Filed: Dec. 12, 1975

[21] Appl. No.: 640,043

[52] U.S. Cl. .............................. 137/487; 137/487.5
[51] Int. Cl.$^2$ ......................................... G05D 7/06
[58] Field of Search ................ 138/30, 31, 45; 137/487.5, 487, 486

[56] References Cited
UNITED STATES PATENTS

| | | | |
|---|---|---|---|
| 2,458,162 | 1/1949 | Hagerbaumer ...................... | 138/45 |
| 2,649,272 | 8/1953 | Barbato .............................. | 138/45 |
| 2,703,959 | 3/1955 | Wetherbee, Jr. .................. | 138/45 X |
| 2,934,892 | 5/1960 | Hurlbert et al. .................. | 138/45 X |
| 2,942,460 | 6/1960 | Morgan ............................. | 138/45 X |
| 3,276,480 | 10/1966 | Kennedy ............................. | 138/45 |
| 3,580,499 | 5/1971 | Baver ........................... | 138/487.5 X |
| 3,601,124 | 8/1971 | Petee .............................. | 137/487.5 X |
| 3,633,597 | 1/1972 | Johe ............................... | 137/487.5 X |

Primary Examiner—Alan Cohan
Attorney, Agent, or Firm—Bosworth, Sessions & McCoy

[57] ABSTRACT

A control system for use in central heating and air-conditioning installations to control the volumetric flow rate of conditioned air through a supply duct to an enclosed space to be serviced. The system is adapted to maintain a desired ambient temperature in the enclosed space by regulating the circulation of conditioned air in accordance with the demand generated by prevailing conditions. An adjustable restrictor valve defining an orifice is located in the supply duct and sensors are provided to continuously measure the orifice diameter and the pressure drop across the orifice. Electronic circuitry is provided to generate a flow rate voltage signal representative of the product of the orifice diameter and the pressure drop across the orifice and to compare the flow rate voltage level with a fixed or temperature controlled reference voltage to obtain either an "increase" or "decrease" control voltage signal. An "increase" control signal is used to enlarge the orifice diameter and increase the volumetric flow rate while a "decrease" control signal is used to decrease the flow rate and reduce the orifice diameter.

6 Claims, 2 Drawing Figures

ELECTRONIC CONTROL FOR CONSTANT AND VARIABLE VOLUME CENTRAL HEATING AND AIR-CONDITIONING SYSTEMS

BACKGROUND OF THE INVENTION

This invention relates to either variable-volume or constant volume type central heating and air-conditioning systems that supply conditioned air on a demand basis to a plurality of enclosed spaces to be maintained at desired conditions of temperature, etc. More particularly, the invention relates to an automatic volumetric flow rate control system for regulating a flow restrictor valve that meters the flow of conditioned air through a supply duct in accordance with the temperature condition etc. in the enclosed space serviced by the duct.

In the past, the most common type of air distribution system in central heating and air-conditioning installations has been the constant volume type wherein a uniform volumetric flow of conditioned air is continuously supplied to the various enclosed spaces to be serviced. The air supplied is heated, cooled or otherwise conditioned in accordance with the overall demand imposed on the system. Thus whether or not the temperature condition etc. in an enclosed space requires a certain amount of air circulation to maintain the desired condition, that amount of air circulation is maintained.

This type of system is inefficient from an energy conservation point of view because during many periods of the day and during many seasons of the year the volume of air flow may far exceed that required by the circumstances. Accordingly, in view of the recent increase in emphasis on energy conservation it has become highly advantageous to utilize a variable-volume-type air distribution system so that a minimum load is imposed on the heating and air-conditioning installation.

Variable-volume-type systems utilize flow restrictor valves in the supply ducts to the individual enclosed spaces to be serviced so that when the temperature in an enclosed space is maintained at the desired level by the existing sources of thermal energy, (e.g., radiation from lighting, from energy emitting appliances, from persons in the space etc.), the restrictor valve reduces the flow rate to a minimum level that matches the demand for conditioned air. When the factors effecting the temperature condition in the room are such that heated or cooled air flow must be modulated in order to provide the desired condition, then the flow restrictor valve is adjusted to pass a greater or smaller volume of air through the duct. In the past the regulation of the restrictor valve has been accomplished by manually controlled devices that must be adjusted periodically depending upon the circumstances. Automatic regulation has been impractical because of the many parameters that are involved in the proper adjustment of the volume of air supplied.

The flow rate through a restriction such as a variable orifice may be determined from the following expression:

$$\text{Flow Rate (CFM)} = 13.55\, d^2\, P$$

Where $d$ is the diameter of the circular orifice and $P$ is the pressure drop across the orifice.

Accordingly, the volumetric flow rate is a function of the square of the orifice diameter and the square root of the pressure differential. The pressure drop across the orifice will vary as the particular condition of the distribution system changes on an hourly and/or seasonal basis due to all the various factors that effect the total demand on the system. Accordingly, at various times of the day and at various seasons of the year the pressure in a particular duct will undergo substantial changes and thus the pressure differential across the orifice cannot be accurately predicted based on the orifice diameter.

The control system of the present invention, however, resolves the difficulties described above and affords other features and advantages heretofore not obtainable.

SUMMARY OF THE INVENTION

It is among the objects of the invention to control the volume of air supplied through a supply duct to an enclosed space in a variable volume type central heating and air-conditioning installation;

A more specific object of the invention is to control a flow restrictor valve in an air supply duct in the distribution system of a variable-volume-type central heating and air-conditioning installation.

These and other objects and advantages are achieved by the novel flow rate control system of the invention which is adapted for use in association with a variable-volume-type central heating and air-conditioning installation and in particular with each individual enclosed space to be serviced by the installation. The system includes an adjustable flow restrictor valve located in the supply duct for the particular enclosed space and which defines a flow restricting orifice. The valve has integral means for adjusting the area of the orifice. The system also includes means for generating an electrical voltage signal that is a function of the product of the diameter of the orifice and the pressure differential across the orifice. The electrical voltage signal is compared with a predetermined reference voltage level and as a result of the comparison either a "decrease" control voltage signal is generated when the voltage signal is greater than the reference level or an "increase" control voltage signal is generated when the voltage signal is less than the reference voltage. The "decrease" output voltage signal is used to energize means for reducing the diameter of the orifice and the "increase" output control voltage signal is used to energize means for increasing the diameter of the orifice.

In accordance with the preferred form of the invention the electrical voltage signal that is a function of the product of the orifice diameter squared and the square root of the pressure differential is generated by sensing the diameter of the orifice and the pressure drop across the orifice, converting the diameter to a voltage signal and the pressure drop across the orifice to another voltage signal, amplifying both the signals logarithmically in separate integrated amplifier circuits and electrically processing the resulting amplified signals to produce a signal representative of the sum of the logarithms of the two initial signals. This signal is respresentative of the product of the square of the diameter and the square root of the pressure differential.

DESCRIPTION OF THE PREFERRED EMBODIMENT

Referring more particularly to the drawings, there is shown a schematic circuit diagram for a control system embodying the invention and adapted to control the volume of air supplied to one of several enclosed spaces to be serviced by a variable-volume-type central heating and air-conditioning installation. The particular space to be serviced is supplied with conditioned air ("e.g." heated, cooled, etc.) through a duct 10 which has a flow control restrictor valve 11 mounted therein, the valve in this instance being an iris-type valve of a kind well known in the art.

Figure 1:
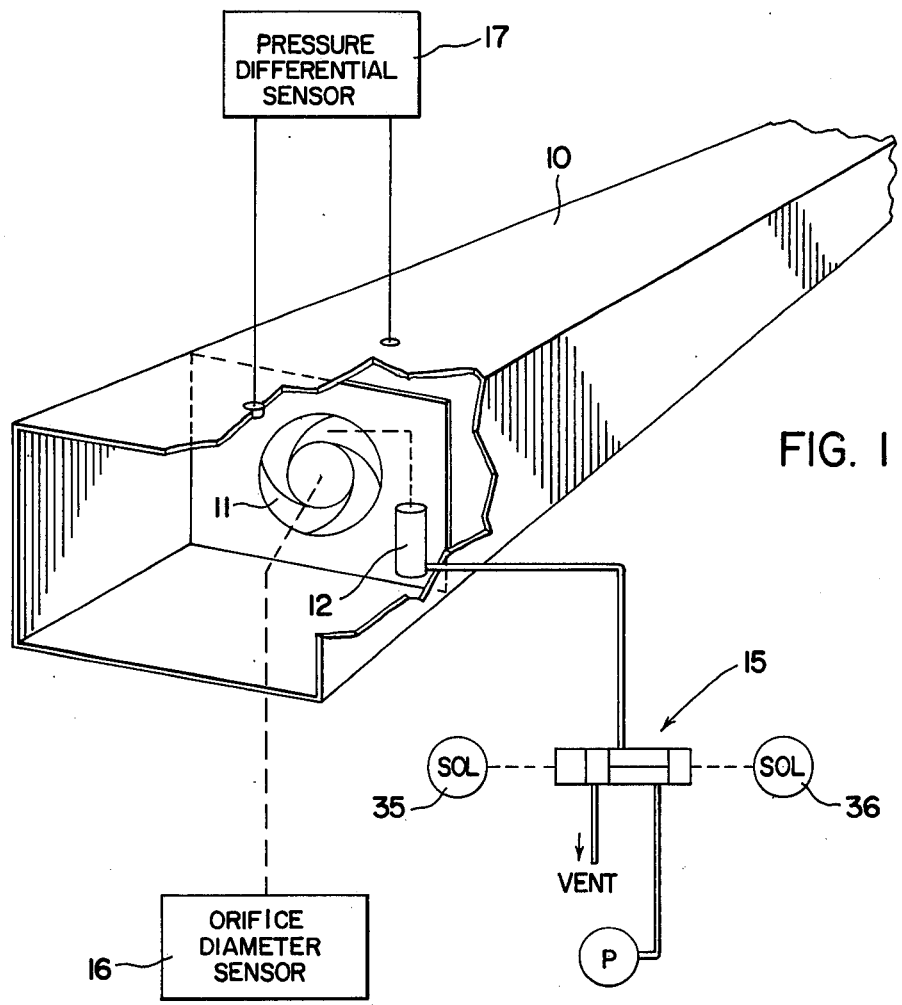
FIG. 1 is a perspective view, with parts broken away, of an air flow duct with a variable flow restrictor valve located thereon with means shown schematically for controlling the size of the restriction.

The diameter of the iris aperture is varied by a fluid cylinder 12 operatively connected to the mechanism for pivoting the plates of the iris about their symmetrically spaced circumferentially located pivot axes. The cylinder 12 is a pneumatic cylinder to which air is selectively supplied by a two-way air valve 15 shown schematically in dashed lines in FIGS. 1 and 2.

The valve 15 admits air to the tail end of the cylinder 12 to extend the piston for the closing function, (the air in the cylinder is captive during periods of system balance) and releases the captive air to permit the piston to retract and the iris valve to open. Thus, during a failure of the control system, the piston 12 would be inclined to retract and open the flow valve due to minute air leakage in the control system.

Figure 2:
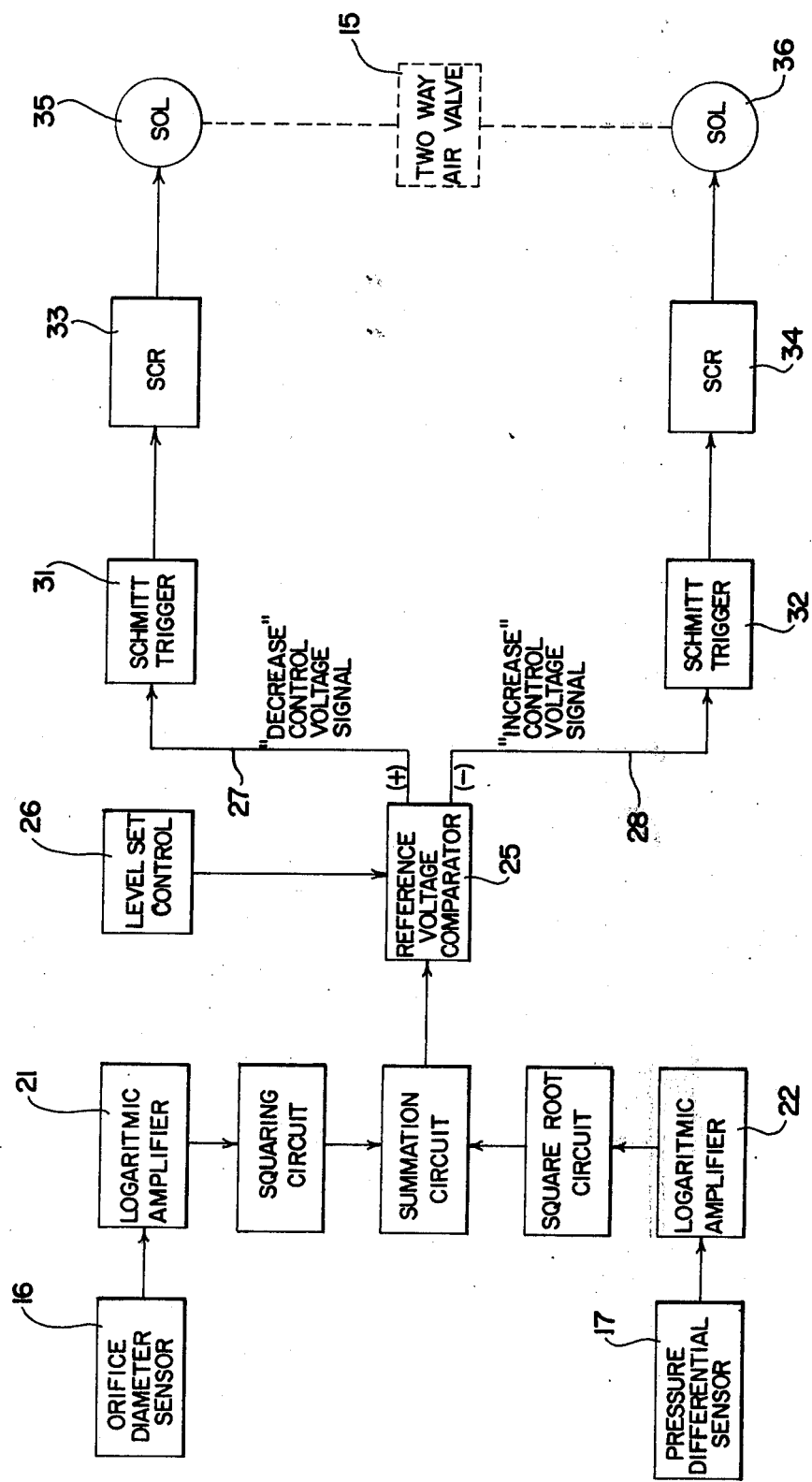
FIG. 2 is a schematic diagram of the electrical control circuitry for automatically controlling the orifice diameter of a flow restrictor valve to vary the air flow through a duct to a space to be maintained at a predetermined condition.

The control circuit uses a diameter sensor 16 and a differential pressure sensor 17 indicated in block form in FIG. 2 and which are adapted to generate electrical voltage level signals representative of the square of the orifice diameter on the one hand and the square root of the pressure differential across the orifice on the other hand.

As indicated above the mass flow rate or volume rate through a restriction may be determined from the following expression:

Flow Rate (CFM) = $13.55 d^2 \times P$ where $d$ is the diameter of the orifice and $P$ is the pressure drop across the orifice.

Accordingly, the mass flow rate or volume rate is a function of the square of the orifice diameter and the square root of the pressure differential. Expressed another way, the volume or flow rate is a function of the sum of the logarithms of the square of the orifice diameter and the square root of the pressure differential.

In accordance with the invention, the diameter sensor 16 is used to convert the existing diameter of the orifice into an electrical voltage level signal while the differential pressure sensor is adapted to convert the pressure differential across the orifice to an electrical voltage level signal for use in the controlling of the mass flow rate through the duct 10.

The diameter sensor may be, for example, a variable Rheostate operatively associated with the pneumatic cylinder 12 for varying the orifice size of the flow control restrictor valve 11.

The pressure differential sensor 17 may comprise, for example, a pair of taps on opposite sides of the orifice used to provide a flow from one side of the orifice to the other, the flow being a function of pressure differential. The flow across the taps is across a hot wire type ananometric sensing mechanism including, for example, a thermistor for generating a voltage signal that is a direct function of the air velocity between the pressure taps.

Accordingly, the sensors 16 and 17 produce electrical voltage level signals that are functions of the diameter of the orifice and the pressure differential across the orifice. These signals are amplified logarithmically in two separate integrated logarithmic amplifier units 21 and 22. This produces two voltage level signals that are functions of the orifice diameter and the pressure differential across the orifice. The two resulting logarithmically amplified signals are then processed electronically to produce a summation signal representative of the sum of the logarithms of the square of the orifice diameter and the square root of the pressure differential.

The summation signal is fed to a comparator 25 wherein the summation signal is compared with a reference voltage level to determine whether or not the summation signal is greater than or less than the reference voltage. The reference voltage comparator 25 is set by a level set control unit 26 which is operatively associated with the thermostatic control in the enclosed space to be serviced by the duct 10.

The reference voltage is preselected for a given temperature. Any deviation in the room air temperature will modulate the reference voltage amplitude in a direction that will counteract the change in room temperature from the predetermined room temperature.

If the summation voltage level is greater than the reference voltage level a "decrease" control voltage signal is sent to the branch 27 of the circuit whereas if the summation voltage level is less than the predetermined reference voltage level an "increase" control voltage signal is sent through the other branch 28. Each branch 27 and 28 has a Schmitt trigger 31 and 32 respectively set to a level of about 0.8 volts so that no control signal is transmitted unless the "increase" or "decrease" control voltage level signal from the comparator 25 is greater than 0.8 volts. This provides a zone of volumetric flow rates wherein no variation will be introduced.

If either of the Schmitt triggers 31 and 32 pass a control voltage signal the respective signal is fed to one of two silicone controlled rectifiers (SCRs) 33 and 34 in the respective branch 27 and 28 respectively.

The SCRs 33 and 34 are effective to generate an operating voltage effective to operate solenoids 35 and 36 of the two-way air valve 15.

The solenoid 35 operates the two-way air valve 15 to cause the operating cylinder 12 to open the orifice and provide an enlarged area to increase the volumetric flow rate. The solenoid 36 operates the two way air valve 15 to the opposite position causing the operating cylinder to decrease the size of the orifice and thus decrease the volumetric flow rate through the duct 10.

It will be seen that the varying of the orifice size will be dependent on two variables. In other words, a demand made upon the system by an existing temperature condition in the enclosed space to be services will result in a directly correlated orifice area. The resulting orifice area provided to meet a certain demand will be a function of the pressure in the overall system which in turn effects the pressure differential across the orifice and upon the orifice diameter as well. The result is that an optimum variation in volumetric flow rate will be provided to meet the unique circumstances existing at the time a demand is made upon the central heating and air-conditioning system.

Consider a conference room where the desired room temperature is 72° and the total air flow into the room is 750 cfm (based, for example, on an occupancy of 6 people).

Where the room is unoccupied, the room temperature would be depressed due to a reduced heat load. As the room air temperature starts to drop from 72° the thermostatic control immediately resets the constant volume control in proportion to the temperature deviation. This provides a gradual deviation from the preset 750 cubic feet per minute air flow volume, and will continue to reset the volumetric flow rate in a gradual manner until the room temperature is again at 72°.

In a similar manner the thermostatic control modulates the air flow rate in a gradual manner to compensate for an increased heat load due to an increased number of people meeting in the conference room. This mode of control is used for heating or cooling. The heating control operates in a reverse manner to that for cooling; as the temperature of the room air rises above a preselected temperature, the supply air is gradually reduced in volume until the room air temperature returns to the selected temperatures. As the temperature of the room air drops below the preselected level, the control admits a larger volume of air to raise the room air temperature to the selected temperature.

A salient feature of the invention is its ability to deliver a constant volume of air with a varying inlet static pressure.

Heretofore the available constant volume controls operated by sensing the static pressure within the air ducts. However, if for some reason, the air flow was restricted down stream from the sensing station, either by some foreign material or a partial to full closing of an air outlet, the static pressure would rise, signaling the control to reduce the air flow, thereby further reducing the air flow to the effected area.

This invention is applicable to air flows of,
A. Constant volume,
B. Variable volume, or
C. A combination of constant volume and variable volume.

Where a constant volume of air flow is desired, the control system is adjusted to provide that volume of air and the air flow will remain constant for varying system static pressure.

If a variable volume of air flow is required, the thermostat is set to the desired temperature and the control system responds to the room temperature, increasing or decreasing the air flow rate to maintain the required room temperature. This application is usually an on and off cycle of air flow. The air flow is either dampered off, or the air flow is on maximum flow at some limited value determined by a fixed opening in an air valve upstream from the control sensing station.

The combination of constant volume and variable volume air flow control embodies desirable features of constant volume and the desirable features of variable volume.

While the invention has been shown and described with respect to a specific embodiment thereof it will be understood that variations and modifications in the specific form shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

We claim:

1. Apparatus for controlling the flow rate of conditioned air through a supply duct to an enclosed space for maintaining a desired ambient temperature therein comprising:

adjustable flow restrictor means located in said duct and defining an orifice, control means for adjusting the size of said orifice, means for generating a first electrical voltage signal representative of the logarithm of the square of a dimension of said orifice, means for generating a second electrical voltage signal representative of the logarithm of the square root of the pressure differential across said orifice summation circuit means for electrically adding said first and second electrical voltage signals to produce a summation voltage signal, means for comparing said summation voltage signal with a predetermined reference voltage level and for generating an "increase" control voltage signal when said summation voltage signal is greater than said reference voltage level and a "decrease" voltage signal when said summation voltage signal is less than said reference voltage level, means responsive to said "increase" control voltage signal for reducing the size of said orifice, and means responsive to said "decrease" control voltage signal for increasing the size of said orifice.

2. Apparatus as defined in claim 1 wherein said adjustable flow restrictor means comprises an iris type flow valve.

3. Apparatus as defined in claim 1 wherein said means for generating a first electrical voltage signal representative of the logarithm of the square of a dimension of said orifice comprises:

means for generating an initial voltage signal representative of said dimension of said orifice, a logarithmic amplifier for amplifying said initial voltage signal and electrical squaring circuit means for electrically squaring said amplified initial voltage signal.

4. Apparatus as defined in claim 1 wherein said means for generating a second electrical voltage signal representative of the logarithm of the square root of the pressure differential across said orifice comprises:

means for generating an initial voltage signal representative of said pressure differential across said orifice, a logarithmic amplifier for amplifying said initial voltage signal and electical square root circuit means for electrically producing the square root of said amplified initial voltage signal.

5. Apparatus for controlling the flow rate of conditioned air through a supply duct to an enclosed space for maintaining a desired ambient temperature therein comprising:

adjustable flow restrictor means located in said duct and defining an orifice, a fluid cylinder operatively connected to said flow restrictor means, a source of fluid pressure, a two-way valve operated by solenoids operatively connected between said cylinder and said fluid pressure source for adjusting the diameter of said orifice, means for generating an electrical voltage signal that is a function of a dimension of said orifice and the pressure differential across said orifice, means for comparing said voltage signal with a predetermined reference voltage level and for generating an "increase" control voltage signal when said voltage signal is greater than said reference level and a "decrease" control voltage signal when said voltage signal is less than said reference level means responsive to said "increase" control voltage signal for reducing the diameter of said orifice, and means responsive to said "decrease" control voltage signal for increasing the diameter of said orifice, one of said solenoids being responsive to said "increase" control voltage signal and the other being responsive to said "decrease" control voltage signal.

6. Apparatus for controlling the flow rate of conditioned air through a supply duct to an enclosed space for maintaining a desired ambient temperature therein comprising:

means located in said duct defining a flow restriction, control means for adjusting the cross sectional area of said flow restriction, means for generating a first electrical voltage signal representative of the logarithm of the square of a dimension of said area of said restriction, means for generating a second electrical voltage signal representative of the logarithm of the square root of a pressure differential produced by the velocity of conditioned air downstream of said restriction, summation circuit means for electrically adding said first and second electrical voltage signals to produce a summation voltage signal, means for comparing said summation voltage signal with a predetermined reference voltage level and for generating an "increase" control voltage signal when said summation voltage signal is greater than said reference voltage level and a "decrease" voltage signal when said summation voltage signal is less than said reference voltage level, means responsive to said "increase" control voltage signal for reducing the area of said restriction, and means responsive to said "decrease" control voltage signal for increasing the area of said restriction.

* * * * *